United States Patent [19]

Bauer

[11] Patent Number: 5,670,853
[45] Date of Patent: Sep. 23, 1997

[54] METHOD AND APPARATUS FOR CONTROLLING VEHICLE OCCUPANT POSITION

[75] Inventor: Barney J. Bauer, Fenton, Mich.

[73] Assignee: TRW Vehicle Safety Systems Inc., Lyndhurst, Ohio

[21] Appl. No.: 349,969

[22] Filed: Dec. 6, 1994

[51] Int. Cl.[6] .................. B60N 2/04; B60R 21/22
[52] U.S. Cl. ............... 318/286; 318/466; 180/273; 280/728.1; 248/550
[58] Field of Search ................ 318/560, 567, 318/625, 626, 264, 265, 266, 286, 466, 467, 468; 248/542, 543, 550; 280/727, 728.1, 728.2, 730.1, 730.2; 180/271, 272, 273

[56] References Cited

U.S. PATENT DOCUMENTS

| | | |
|---|---|---|
| 3,457,548 | 7/1969 | Mazurkiewicz . |
| 4,158,160 | 6/1979 | Meiller ............................ 318/467 |
| 4,264,050 | 4/1981 | Wahls . |
| 4,625,329 | 11/1986 | Ishikawa et al. . |
| 4,797,824 | 1/1989 | Sugiyama et al. . |
| 4,802,706 | 2/1989 | Onimaru et al. . |
| 4,811,226 | 3/1989 | Shinohara . |
| 4,845,620 | 7/1989 | Parker . |
| 5,008,946 | 4/1991 | Ando . |
| 5,058,852 | 10/1991 | Meier et al. ........................ 248/588 |
| 5,071,160 | 12/1991 | White et al. . |
| 5,072,966 | 12/1991 | Nishitake et al. . |
| 5,074,583 | 12/1991 | Fujita et al. . |
| 5,118,134 | 6/1992 | Mattes et al. . |
| 5,125,472 | 6/1992 | Hara . |
| 5,161,820 | 11/1992 | Vollmer ........................... 280/730 |
| 5,232,243 | 8/1993 | Blackburn et al. ............... 280/732 |
| 5,346,170 | 9/1994 | Schmidt et al. .................. 248/550 |
| 5,413,378 | 5/1995 | Steffens, Jr. et al. ............ 280/735 |

FOREIGN PATENT DOCUMENTS 4137719  9/1992  Germany .

Primary Examiner—Bentsu Ro
Attorney, Agent, or Firm—Tarolli, Sundheim, Covel, Tummino & Szabo

[57] ABSTRACT

An apparatus (20) controls the position of an occupant (32) in a vehicle passenger compartment by sensing physical characteristics of the occupant such as weight, height, girth, and leg length. A controller (36) controls seat motors (92, 94, 96) to move the occupant (32) to a position based on the sensed physical characteristics of the occupant. The occupant (32) can override the system using override controls (98). The controller (36) also adjusts the performance of an occupant restraint (22) in response to a selected occupant position.

27 Claims, 3 Drawing Sheets

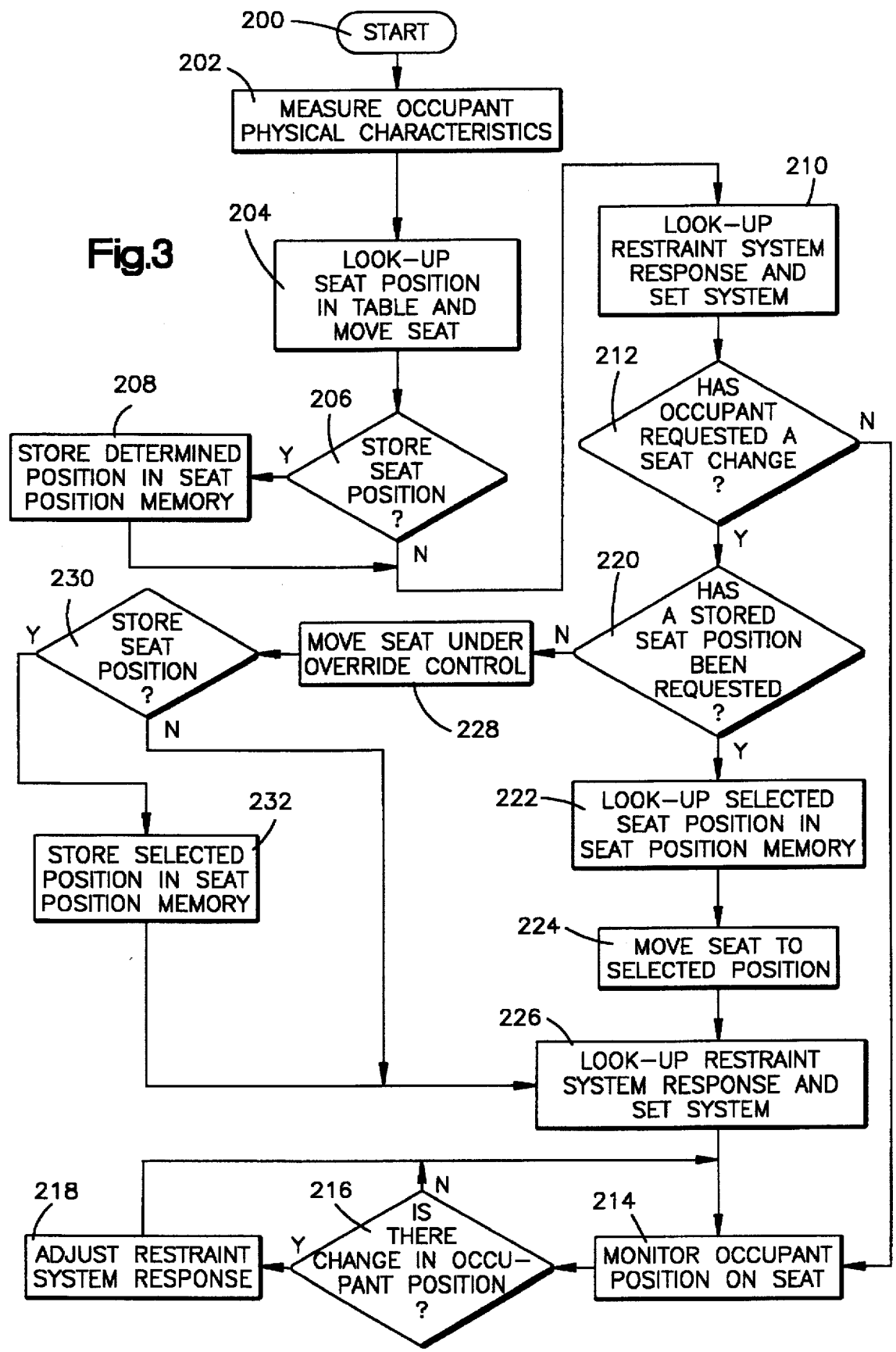

METHOD AND APPARATUS FOR CONTROLLING VEHICLE OCCUPANT POSITION

TECHNICAL FIELD

The present invention is directed to a vehicle occupant restraint system and is particularly directed to a method and apparatus for controlling occupant position as it relates to a vehicle occupant restraint system.

BACKGROUND OF THE INVENTION

Vehicle restraint systems that include an air bag mounted forward of the occupant's seating position are well known in the art. Such restraint systems also include either an inertia switch or an accelerometer for sensing the occurrence of a crash condition. When a crash condition of sufficient severity is sensed, the air bag is deployed.

Air bag restraint systems having various occupant sensors to determine the presence and position of an occupant on a vehicle seat are also known. Some prior art occupant restraint systems having occupant sensors permit deployment of the air bag only when an occupant is present, thereby preventing deployment when the vehicle seat is not occupied. Other known systems tailor the deployment of the air bag in response to sensed occupant position by (i) aiming the air bag and (ii) controlling the amount of inflation fluid used to inflate the air bag during deployment.

Movable seats in a vehicle are also well known in the art, as are power electric seats having seat memory locations. In such power electric seats, an occupant may store a particular seat position in an electric memory. Upon entering the vehicle, the operator can move the seat to a prestored location by activating a recall control.

SUMMARY OF THE INVENTION

The present invention provides a method and apparatus for positioning an occupant in a vehicle passenger compartment to an occupant position corresponding to a potentially improved restraining condition.

An apparatus in accordance with the invention controls the position of an occupant in a vehicle passenger compartment to potentially improve a restraining function of an occupant restraint system. The apparatus includes sensing means for sensing at least one occupant characteristic and providing a signal indicative of the sensed characteristic. The apparatus further includes control means operatively coupled to the sensing means for determining an occupant position within the vehicle passenger compartment in response to the sensed occupant characteristic and for providing a control signal in response to the determined occupant position. The apparatus further includes occupant positioning means, for positioning the occupant to the determined occupant position in response to the control signal.

In accordance with a preferred embodiment of the present invention, an apparatus is provided for positioning a vehicle occupant within a passenger compartment in response to sensed occupant characteristics. The occupant characteristic sensing means preferably includes means for sensing occupant (i) position and weight on an occupant seat, (ii) height, (iii) leg length, and (iv) girth. The position and weight sensing means includes weight and position sensors mounted in the occupant seat cushion. These sensors provide signals indicative of the position and weight of an occupant on the seat. A height sensing means preferably includes a height sensor mounted on the interior of the vehicle roof above the occupant for providing a signal having a value indicative of the height of the occupant on the vehicle seat. The height sensor is preferably an ultrasonic sensor. The occupant characteristic sensing means further comprises a leg length sensor mounted on or near the vehicle floor for providing a signal indicative of the leg length of the occupant. The occupant characteristic sensing means further includes a seat belt payout sensor for providing a signal indicative of the occupant's girth.

The apparatus further preferably comprises position override means including seat position selecting means for overriding the determined occupant position and moving the seat position to that selected by the occupant. Control means is operatively connected to the occupant physical characteristic sensing means, the seat position selecting means, and to the seat positioning means for (i) positioning the occupant in a seat position to the occupant position, and (ii) controlling the vehicle restraint system based on the sensed occupant characteristics.

A method in accordance with the present invention controls the position of an occupant in a vehicle passenger compartment. The method comprises the steps of sensing at least one characteristic of a vehicle occupant, determining an occupant position from the sensed characteristic and moving the occupant to the determined occupant position.

In accordance with a preferred embodiment of the present invention, the step of sensing an occupant characteristic includes sensing occupant (i) position and weight, (ii) height, (iii) leg length, and (iv) girth. The method further includes permitting the occupant to change position from the determined occupant position. The method further includes (i) positioning the occupant to the determined occupant position and (ii) controlling a vehicle restraint system in response to the sensed occupant characteristic.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a flow chart depiction of a control process followed by the controller shown in FIG. 1.

DESCRIPTION OF PREFERRED EMBODIMENT

Figure 1:
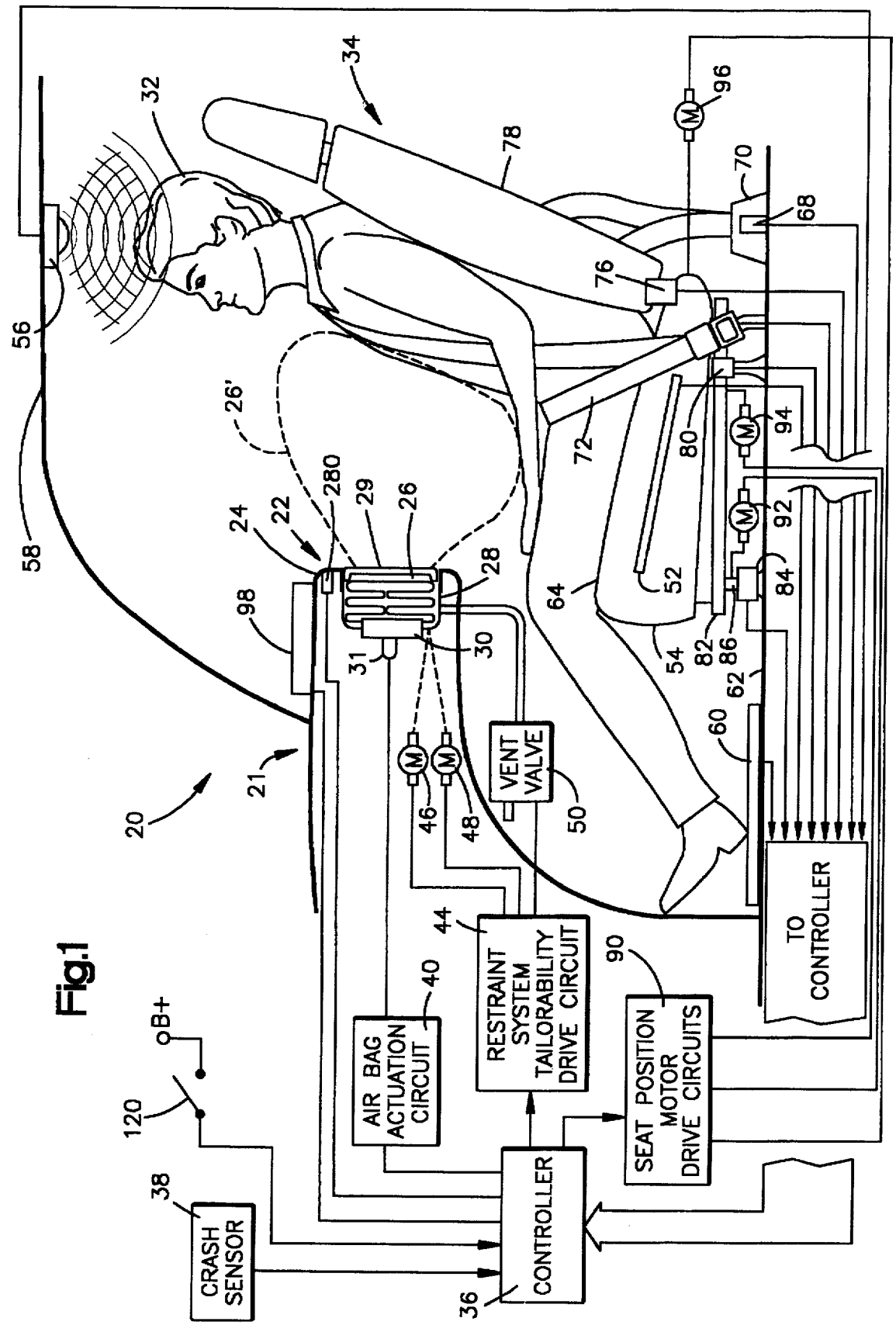
FIG. 1 is a schematic diagram of an occupant restraint system made in accordance with one embodiment of the present invention.

Referring to FIG. 1, an apparatus 20 is shown for controlling occupant position in a vehicle passenger compartment. The apparatus 20 includes a restraint system 21 having an air bag assembly 22 mounted in an instrument panel/dashboard 24 of a vehicle. The air bag assembly 22 includes an air bag 26 stored within the interior of an air bag housing 28. The air bag housing is movably mounted in the instrument panel/dashboard 24. A front cover 29 of a type well known in the art covers the air bag housing 28.

A source 30 of inflation fluid is mounted to the housing 28 and is operatively connected to the air bag 26. The source 30 of inflation fluid may be a combustible gas generating material and/or pressurized fluid or other inflation means. A squib 31 is operatively connected to the source of inflation fluid 30. When the squib 31 is energized, inflation fluid from the source 30 fills the air bag 26 to its inflated condition 26'. Once inflated, the air bag 26 restrains an occupant 32 located on an occupant seat 34 of a vehicle.

An electronic controller 36, such as a microcomputer, is operatively connected to a vehicle crash sensor 38. The crash sensor 38 can be any of several known types. For example, the crash sensor 38 may be an inertia switch, such as a rolamite sensor. Closure of a normally open inertia switch is indicative of a crash event.

Preferably, the crash sensor 38 is an accelerometer that outputs an electric signal indicative of vehicle deceleration and having a characteristic indicative of a type of vehicle crash condition. Several crash evaluation algorithms are known in the art, any one of which may be used with the present invention. These crash evaluation algorithms monitor the output of an accelerometer and discriminate between deployment and non-deployment crash events. A deployment crash event is one in which the air bag assembly 22 or other restraint is to be deployed or actuated. A non-deployment crash event is one in which the restraint is not to be deployed or actuated. Some examples of such algorithms that may be used with the present invention are disclosed in U.S. Pat. Nos. 5,216,607, 5,073,860, and 5,034, 891.

Once the controller 36 determines that a deployment crash event is occurring, the controller 36 sends a control signal to an air bag actuation circuit 40. The air bag actuation circuit 40 ignites the squib 31 which, in turn, actuates the source of inflation fluid 30 and causes the inflation fluid to flow into and deploy the air bag 26.

Controller 36 is operatively connected to a restraint system tailorability drive circuit ("SSTDC") 44. SSTDC 44 is controllably connected to air bag "aiming" motors 46, 48 which are operatively connected to air bag housing 28. The motors 46, 48 control movement of the air bag assembly 22 so as to control the orientation of the air bag relative to the position of occupant 32 on seat 34. The air bag assembly 22 may be "aimed" upward, downward, leftward, or rightward relative to the occupant 32. The air bag assembly is also movable fore and aft using motors 46, 48.

A vent valve 50 is controllably connected to SSTDC 44 and in fluid communication between atmosphere and the housing 28 of the air bag assembly 22. The vent valve 50 is used to control fluid pressure during inflation of air bag 26. If the vent valve 50 is fully closed upon actuation of the squib 31, the air bag inflates with maximum pressure. By controlling the opening of vent valve 50, the final or overall inflation pressure of the air bag 26 is controlled. The tailorable air bag restraint system using air bag aiming motors 46, 48 and vent valve 50 is fully shown and described in U.S. Pat. No. 5,232,243.

Occupant seat 34 includes an occupant position and weight sensor 52 located in a bottom cushion 54 of occupant seat 34. Controller 36 is operatively connected to position and weight sensor 52. The position and weight sensor 52 is preferably an N×M array of individual position and weight sensors as shown and described in U.S. Pat. No. 5,232,243. Position and weight sensor 52 detects and provides a signal to controller 36 indicative of (i) whether an object is present on the seat, (ii) the weight of the object, and (iii) the position of the object on the seat. Those skilled in the art will appreciate that position of an occupant on seat 34 may be sensed using different arrangements. For example, position of the occupant may be sensed by using a plurality of ultrasonic sensors mounted at various locations in the passenger compartment. Weight may alternatively be sensed using a weight sensor other than that disclosed in the '243 patent.

Occupant height is sensed using a height sensor 56 mounted on the interior of a vehicle roof 58. In a preferred embodiment, an ultra sonic sensor is used. The height sensor 56 is operatively connected to controller 36 and provides a signal indicative of the occupant's height.

Occupant leg length is measured using a leg length sensor 60 located on and secured to the vehicle floor 62 at a predetermined location. Sensor 60 is operatively connected to controller 36 and provides a signal functionally related to occupant leg length as determined by (i) the contact point of occupant's foot with the sensor 60, (ii) the distance between the front of bottom cushion 54 and the sensor 60 and (iii) the distance between the vehicle floor 62 and the upper surface 64 of bottom cushion 54. It is contemplated that sensor 60 would include an M×N array of pressure sensors. The controller 36 would monitor which of the sensors are pressed.

The girth of occupant 32, i.e., the circumference of the occupant's midsection, is sensed using a seat belt payout sensor 68 located in a seat belt retractor 70 attached to vehicle floor 62. The seat belt payout sensor 68 is electrically connected to controller 36. Seat belt payout sensor 68 measures the length of seat belt 72 extracted from or paid out from seat belt retractor 70 and provides a signal indicative of that length.

Figure 2:
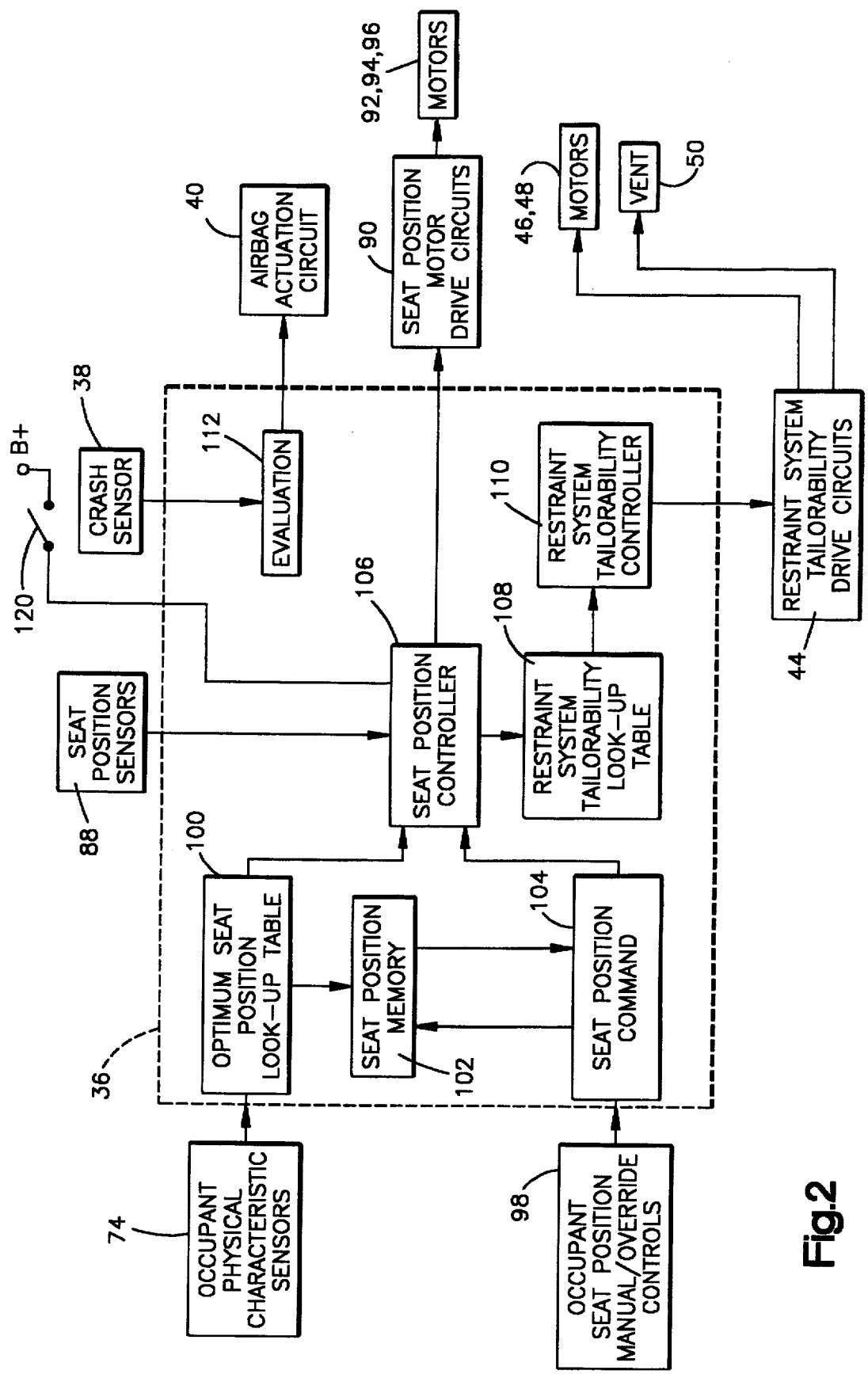
FIG. 2 is a schematic block diagram of a portion of the occupant restraint system of FIG. 1 made in accordance with one embodiment the present invention.

The weight sensor 52, height sensor 56, leg length sensor 60, and girth sensor 68 are collectively referred to as occupant physical characteristic sensors 74 (FIG. 2).

A seat back incline sensor 76 is operatively connected between bottom cushion 54 and upper or seat back cushion 78 of seat 34. Sensor 76 provides an electrical signal indicative of the angular position of upper cushion 78 relative to the lower cushion 54. Preferably, seat back incline sensor 76 is a rotary potentiometer.

A seat fore and aft position sensor 80 is operatively connected to bottom cushion 54 and a rail 82 mounted to the floor 62. The seat 34 is slidably mounted to rail 82 in a manner well known in the art. Sensor 80 provides an electrical signal indicative of the fore and aft position of seat 34 relative to a predetermined reference point within the occupant compartment. Sensor 80 may be either a linear potentiometer or a linear voltage differential transformer. Based on the signal from sensor 80, the relative location between the seat 34 and the front cover 29 for the air bag housing 28 can be determined.

A seat height sensor 84 is operatively connected between the floor 62 and a vertically adjustable seat support 86. The seat 34 is mounted to the seat support 86 in a manner well known in the art. This mounting arrangement permits vertical adjustment of seat 34 relative to the floor 62. Sensor 84 provides an electrical signal indicative of the vertical position of the seat 34 relative to vehicle floor 62. Sensor 84 may be a linear potentiometer or a linear voltage differential transformer. Based on the signal from sensor 84, the distance from the vehicle floor 62 to an upper surface 64 of bottom cushion 54 can be determined. The seat incline sensor 76, fore/aft sensor 80, and seat height sensor 84 are collectively referred to as the seat position sensors 88 (FIG. 2). Seat position sensors 88 are operatively coupled to a seat position controller 106.

Seat position controller 106 is controllably connected to seat position motor drive circuits 90. Seat position motor drive circuits 90 are electrically connected to electric motors 92, 94, and 96. Seat height adjustment motor 92 is operatively connected to the occupant seat 34 so as to adjust the distance between the upper surface 64 of the seat 34 and the vehicle floor 62. Seat fore/aft position motor 94 is operatively connected to the occupant seat 34 so as to adjust the fore and aft position of the seat 34 on the rail 82. Seat back incline motor 96 is operatively connected between the bottom cushion 54 and the upper cushion 78. Motor 96 adjusts the angular position of the upper cushion 78 relative to the seat cushion 54. The motors 92, 94, and 96 are used to control the position of the seat 34 and, in turn, the position of the occupant 32 within the vehicle passenger compartment.

Occupant seat position manual/override controls 98 are operatively connected to a seat position command function 104 of controller 36. Occupant seat position override controls 98 are used by the occupant 32 to enter a seat position command manually. Through controls 93, the occupant 32 can selectively energize motors 92, 94, 96 until he has reached a desired seat position.

Alternatively, the occupant can recall a stored seat position having a predetermined seat back incline, seat fore and aft position, and seat height.

Override controls 98 are shown mounted to instrument panel/dashboard 24 for convenience of illustration. The seat position controls 98 can be mounted to any occupant accessible location and preferably are located on the side of the vehicle seat bottom cushion 54, in a door panel, or in an arm rest (not shown).

Referring to FIG. 2, controller 36 includes a seat position look-up table 100. Seat position look-up table 100 includes stored values of seat position values as a function of corresponding measured occupant physical characteristics. The occupant physical characteristic sensors 74, i.e. occupant weight and position 52, occupant height 56, occupant leg length 60, and occupant girth 68, provide input data to table 100 of controller 36. The combination of the occupant physical characteristics, sensed by sensors 74, describes the characteristics of a particular occupant. For a particular occupant having a particular combination of occupant physical characteristics, e.g., a six foot, 200 lb. person with a 36 inch girth, there is a seat position (referred to as the "determined occupant position") within the vehicle passenger compartment that will improve the likely effectiveness of the air bag 26, provide a clear view through the vehicle windows, and permit comfortable contact with the vehicle's operating foot pedals. The determined occupant position for a particular occupant has specific values of the seat position, i.e. seat back incline 76, seat fore/aft position, and seat height. It is these seat position values for the determined occupant position that are stored in look-up table 100 and are output from the table for control purposes.

Seat position look-up table 100 is operatively connected to a seat position memory 102 of the controller 36 and to a seat position controller 106. The seat position sensors 88 are connected to the seat position memory 102. Seat position command function 104 is operatively coupled to the manual controls 98, the seat position controller 106, and the seat position memory 102. Values corresponding to either a determined occupant position value output from the look-up table 100 or from a manually selected position as sensed by the seat position sensors 88 may be stored in the seat position memory 102.

The seat position controller 106 is controllably connected to the seat position motor drive circuits 90 and monitors the present position of the seat 34 using the signals provided by the seat position sensors 88. The seat position controller 106 compares the present seat position, as indicated by the sensors 88, against the desired seat position from either the look-up table 100 or the seat position command function 104. If the seat position controller 106 does not receive a seat position from the seat position command function 104, the controller 106 defaults to a seat position selected from the seat position look-up table 100. If the seat position command function 104 provides a signal to the seat position controller 106 indicating that an occupant has chosen a seat position, the seat position controller 106 controls motors 92, 94, 96 to move the seat to that selected position. If the occupant has commanded the seat 34 to be moved to a location stored in the memory 102, that location is recalled from the memory 102. The controller 106 determines the difference between the present seat position and the seat position recalled from memory. The controller 106 provides control signals to seat position motor drive circuits 90 which, in turn, actuate the motors 92, 94, and 96 to move the seat 34 to the recalled seat position. If the occupant actuates a manual movement switch of the controls 98, the corresponding motor 92, 94, or 96 is energized until the switch is released, in a manner well known in the art. The occupant can store either a determined occupant position from the look-up table 100 or a manually selected seat location in memory 102 by actuating a memory switch of controls 98.

The vehicle ignition switch 120 is connected to controller 106. Preferably, the controller 106 will move the occupant to a determined occupant position selected from the look-up table 100, when the ignition switch 120 is actuated to an "ON" condition. Moving the seat to such a determined occupant position is the default condition of the controller 106, i.e., the seat is always moved to a determined occupant position from the look-up table 100 unless a command is received from the command function 104. The seat position from the look-up table 100 is stored in the memory 102 each time the vehicle is started independent of actuation of controls 98. If the occupant has manually selected a different position, he can return to the determined occupant position from the look-up table 100 by recalling that determined occupant position from memory using an associated control switch on controls 98.

The seat position controller 106 is further connected to a restraint system tailorability look-up table 108. The restraint system look-up table 108 includes restraint system setting values selected in response to the seat position whether that seat position is the determined occupant position from the look-up table 100 or a position selected manually by the vehicle occupant 32. The restraint system settings include values used for aiming the air bag system and regulating the vent value 50. Although not shown, seat belt stiffness and the position of a seat belt anchor could also be controlled as a function of seat position to improve both comfort and restraining potential of the occupant as a function of the measured physical characteristics. The restraint system look-up table 108 is operatively coupled to a restraint system tailorability controller 110. The controller 110 uses the values from the table 108 indicative of restraint systems settings of the vehicle restraints to control restraint system tailorability drive circuits 44.

The restraint system tailorability drive circuits ("SSTDC") 44 energize motors 46 and 48 and set vent 50 as described in the above-referenced U.S. Pat. No. 5,232,243. Basically, the air bag assembly 22 is aimed in response to the occupant's position and height. The vent valve 50 is controlled as a function of weight and distance between the occupant 32 and the air bag assembly 22.

The crash sensor 38 is operatively coupled to an evaluation function 112 in the controller 36. The sensor 38 provides an electrical signal to the evaluation function 112 indicative of vehicle deceleration. The evaluation function 112 processes the output signal from crash sensor 38 and determines if a deployment or non-deployment crash event is occurring. The evaluation of the accelerometer signal by the evaluation function 112 may involve one or a combination of several known evaluation techniques including (i) integration of the acceleration signal to determine crash velocity, (ii) double integration of the acceleration signal to determined crash displacement, (iii) differentiation of the acceleration signal to determine crash jerk, (iv) frequency component monitoring to determine the presence or absence of certain frequency components in the acceleration signal, and/or (v) determination of crash energy from the acceleration signal. Each of these evaluation techniques is referred to in the art as "a crash algorithm" or "a crash metric." For many particular crash metrics that are used, the determined value is typically compared against a predetermined threshold value. If the threshold value is exceeded, a deployment crash event is occurring. When crash sensor 38 indicates that the vehicle is experiencing a deployment crash event, the evaluation function 112 provides an actuation signal to air bag actuation circuit 40. When the air bag actuation circuit 40 is actuated, the air bag 26 is actuated according to the restraint system tailorability control settings.

Referring to both FIGS. 1 and 2, in accordance with a preferred embodiment of the present invention, an occupant 32 enters the vehicle and is seated in the seat 34. After either a predetermined time delay or closure of the ignition switch 120, the occupant physical characteristic sensors 74 and seat position sensors 88 provide signals to the controller 36 indicative of the values sensed for each individual sensor. More specifically, the occupant physical characteristic sensors 74 provide signals indicating the occupant's (i) position and weight, sensor 52, (ii) height, sensor 56, (iii) leg length, sensor 60, and (iv) girth, seat belt pay out sensor 68, to seat position look-up table 100 of controller 36. The seat position sensors 88 provide signals indicative of (i) seat fore and aft position, sensor 80, (ii) seat height, sensor 84, and (iii) seat back tilt, sensor 76. In addition to considering performance capabilities of the air bag restraint system, determination of an occupant seat position for the vehicle driver, as established in the look-up table 100, includes consideration of (i) driver view through vehicle windows and mirrors, (ii) driver distance from the steering wheel, (iii) driver position relative to the vehicle brake, accelerator, and clutch pedals. Based on the signals from the sensors 74 and 88, occupant seat position values for (i) fore and aft position, (ii) seat height, and (iii) seat tilt are output from look-up table 100 to the seat position controller 106.

The seat position controller 106 compares the present sensed position of seat 34, as sensed by the sensors 88, against the seat position values output from the look-up table 100. The seat position controller 106 provides a control signal to seat position motor drive circuits 90 so as to actuate the motors 92, 94, 96 in the appropriate direction until the seat position sensors 88 indicate that the seat 34 is at the seat position determined from the look-up table 100.

The seat position controller 106 also provides signals indicative of the seat position, occupant position on the seat, and occupant physical characteristics to the restraint system tailorability look-up table 108. In response to those signals, the restraint system look-up table 108 outputs values corresponding to settings for the vehicle restraint system for an occupant with those physical characteristics located in the sensed position. The look-up table 108 provides signals to the restraint system tailorability controller 110, which, in turn, controls the restraint system tailorability drive circuits 44. The SSTDC 44 controls aiming motors 46, 48 and vent valve 50. The restraint system tailorability control, in effect, fine tunes the restraint system.

The occupant (whether driver or passenger) has the option of by-passing or overriding the control signal provided by the controller 106 based on seat position values from the look-up table 100. Either before or after the seat moves, the occupant 32 can use manual controls 98 to override the seat position selected from the look-up table 100. These controls include a fore and aft switch (not shown) for moving the seat forward and backward, a height adjustment switch (not shown) to raise or lower the seat 34 relative to the floor 62, a store switch (not shown) used to record in memory 102 either a seat position command or a determined occupant position based on outputs from look-up table 100 and preferably two recall switches (not shown) for each recalling a selected single seat position from memory 102. The seat position controller 106 responds to a manual input request from controls 98. If the seat 34 is moved through a manual switch command to a position other than one based on outputs from the look-up table 100, the tailorability controller 110 must make relatively greater adjustments to "correct" for this position of the seat.

Referring to FIG. 3, the control process of the present invention will be better appreciated. As mentioned above, the control process of the present invention is initiated by the turning "ON" of the ignition switch 120. In step 200, the control process is initialized by controller 36 in which self-diagnostics of the controller are performed, timers reset, memories are cleared, etc., as is well known in the art. Also, in step 200, the present seat position is determined by monitoring the sensors 88. In step 202, the occupant physical characteristic sensors 74 are monitored to determine the occupant's physical characteristics. Based on the measured physical characteristics of the occupant, the seat position look-up table 100 provides seat position data to seat position controller 106 in step 204. Also in step 204, the seat position controller 106 compares the determined occupant position from the look-up table 100 against the present seat position as indicated by the seat position sensors 88 which were monitored during system initialization in step 200. The seat position sensors 88 continue to provide signals indicative of the present seat position throughout the control process. Control signals are provided by the seat position controller 106 to the seat position motor drive circuits 90 which, in turn, actuate motors 92, 94, and 96 to adjust the seat 34 until the present seat position matches the seat position values provided by the seat position look-up table 100.

In step 206, a determination is made as to whether the occupant 32 chose to store the determined occupant seat position provided by the look-up table 100 in the seat position memory 102 for future use. As mentioned, the control process could be arranged so that the determined occupant position provided by the look-up table 100 is automatically stored in memory 102. If the determination in step 206 is affirmative, then the present seat position is stored for future use in step 208. After the position is stored in step 208, or if the occupant chooses not to store the position in step 206, the process proceeds to step 210 where controller 36 determines the restraint system response from the restraint system tailorability look-up table 108 for the present seat position and the occupant's physical characteristics. The restraint system look-up table 108 provides the restraint system settings to restraint system tailorability control 110 based on the present seat location and the physical characteristics of the occupant 32. The restraint system tailorability control 110 provides control signals to the restraint system tailorability drive circuits 44, which, in turn, actuate air bag aiming motors 46, 48 and vent valve 50 so as to fine tune the air bag restraint system 21 for that particular seat location and that particular occupant.

After the system has positioned the occupant 32 in the determined occupant position provided by the look-up table 100 and made any necessary adjustments to the restraint system 21, the occupant has the option of accepting the seat position as the final seat position or choosing a different seat position. The process proceeds to step 212 where the system determines whether the occupant has requested a seat position change from the determined occupant position provided by the look-up table 100. If the determination in step 212 is negative, i.e. the occupant has not requested a seat position change, the process proceeds to step 214.

In step 214, position and weight sensor 52 is continuously monitored to determined the position of the occupant 32 on the seat 34. It will be appreciated that the occupant's position on the seat 34 may be monitored using different sensors, for example, ultrasonic sensors or infrared sensors. The process proceeds to step 216 where a determination is made as to whether there has been a change in the occupant's position on the seat 34. If the determination in step 216 is affirmative, the process proceeds to step 218. In step 218, the controller 36 adjusts the restraint system settings based on the new occupant position on seat 34. The process returns from step 218 to step 214 from either step 218 or a negative determination in step 216. It will be appreciated that the control process continuously monitors (step 214) and adjusts (step 218) the restraint system settings based upon the occupant's position on the seat 34.

If the determination in step 212 is affirmative, i.e., occupant seat position override controls 98 are used by occupant 32 to select a seat position change, the process proceeds to step 220. In step 220, the controller 36 determines whether the occupant has selected (i) a previously stored seat position or (ii) is adjusting the seat position using the fore/aft and/or up-down switches. If the determination in step 220 is affirmative, i.e. the occupant has selected a previously stored seat position, the process proceeds to step 222. In step 222, the seat position override command function 104 retrieves from the seat position memory 102 the stored seat position selected by the occupant 32 and provides the occupant selected seat position data to the seat position controller 106 as the final seat position. In step 224, control signals are provided by the seat position controller 106 to seat position motor drive circuits 90 which, in turn, actuate the motors 92, 94, and 96 to adjust the seat 34 until the seat position matches the stored seat position.

The process proceeds to step 226 where controller 36 determines the restraint system response from the restraint system tailorability look-up table 108 for the seat position selected by the occupant and the occupant's measured physical characteristics. The restraint system look-up table 108 provides the restraint system settings to the restraint system tailorability controller 110. The restraint system tailorability controller 110 provides control signals to the restraint system tailorability drive circuits 44, which, in turn, actuate the air bag aiming motors 46, 48 and vent valve 50 to adjust the restraint system for the occupant selected stored seat position. From step 226, the process proceeds to step 214 in which the occupant's position on the seat 34 is monitored as described above.

If the determination in step 220 is negative, i.e. the occupant has not requested a stored seat position but wants the seat moved under manual switch control, the process proceeds to step 228. In step 228, the occupant 32 changes the seat position using seat control switches such as a fore/aft switch, an up-down switch, or a tilt switch. The occupant 32 selects the desired seat position by manipulating the switches, as is well known in the art. In step 228, control signals are provided by the seat position control 106 to the seat position motor drive circuits 90 which, in turn, actuate motors 92, 94, and 96 to adjust the seat 34 until the occupant stops manipulating the switches.

The process proceeds to step 230 where the occupant may choose to store the manually selected, present seat position in the seat position memory 102 for future use. If the determination is affirmative, the process proceeds to step 232 where the position is stored for future use. After the present position is stored in step 232, or if the occupant chooses not to store the position in step 230, the process proceeds to step 226 where controller 36 determines the restraint system response from the restraint system tailorability look-up table 108 for the occupant selected override seat position as discussed above.

The process, in step 226, determines the restraint system response from the restraint system tailorability look-up table 108 for the occupant selected seat position. The restraint system look-up table 108 provides the restraint system settings to the restraint system tailorability control 110. The restraint system tailorability control 110 provides control signals to the restraint system tailorability drive circuits 44, which, in turn, actuate the air bag aiming motors 46, 48 and the vent valve 50 to adjust the restraint system for the occupant selected seat position. From step 226, the process proceeds to step 214 in which the occupant's position on the seat 34 is monitored and the restraint system response is adjusted as described above.

Those skilled in the art will appreciate that the order of the steps shown in FIG. 3 may be begun upon entry of the occupant 32 into the vehicle or after the ignition is turned "ON". Also, the manual control switches of the controls 98 could be actuated before the occupant has been moved to the determined restraint position provided by the look-up table 100. Furthermore, a warning device, such as a light, could be actuated to an ON condition whenever the occupant overrides the determined restraint position provided by the look-up table 100.

The present invention further contemplates that the occupant seat can be manually moved into the determined occupant position. To accomplish such an arrangement, the seat position look-up table 100 would actuate an indicator 280 located in view of the occupant 32. The indicator 280 would indicate whether the occupant is to move the seat up or down, fore or aft. When the seat has been finally positioned at a location corresponding with the determined occupant position as sensed by the sensors 88, the indicator 280 would provide another indication such as a green light. When the seat is not in the determined occupant position, the indicator 280 would provide another indication such as a red light.

It is also contemplated that the occupant physical characteristic sensors can be used as an intrusion alarm system. The sensors 74, for such a system, would continuously be in an active mode. An authorized vehicle occupant could disable the alarm feature using a remote transmitter and a receiver connected to controller 36. If the alarm system were not deactuated prior to or within a predetermined time period after entry into the vehicle, the detection of an occupant's presence by sensors 74 would result in the controller 36 activating an intrusion alarm. It is also possible that the alarm system could compare physical characteristics of authorized vehicle users stored in a memory against measured values of the present occupant. If a match did not occur, an intrusion alarm could be actuated. Such a characteristic matching system would have the capability to learn the characteristics of authorized vehicle users in a manner similar to the "learn mode" of a garage door system. The occupant would sit on seat 34 and activate the system's "learn mode." The system would thus measure the occupant's physical characteristics and store them in an internal, non-volatile memory as an authorized user characteristic. Only occupants matching the authorized user's characteristics within a percentage of permitted error would be able to start and/or operate the vehicle.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling position of an occupant in a vehicle passenger compartment to adjust performance of an occupant restraint system comprising:

sensing means for sensing at least one occupant characteristic and providing a signal indicative of said at least one characteristic;

control means operatively coupled to said sensing means for determining an occupant position within the vehicle passenger compartment in response to both said at least one sensed occupant characteristic and a performance characteristic of said occupant restraint system, said control means providing a control signal in response to said determined occupant position; and occupant positioning means for positioning the occupant to said determined occupant position in response to said control signal.

2. The apparatus of claim 1, wherein said control means includes an override selection means operatively connected to the occupant positioning means for permitting the occupant to override said occupant position determined by said control means so that said occupant positioning means responds to said override selection means.

3. The apparatus of claim 1, wherein said sensing means provides an electrical signal indicative of the weight of the occupant.

4. The apparatus of claim 1, wherein said sensing means provides an electrical signal indicative of the height of the occupant.

5. The apparatus of claim 1, wherein said sensing means provides an electrical signal indicative of the girth of the occupant.

6. The apparatus of claim 1, wherein said sensing means provides an electrical signal indicative of the leg length of the occupant.

7. An apparatus for controlling position of an occupant in a vehicle passenger compartment comprising:

sensing means for sensing at least one occupant characteristic and providing a signal indicative of said at least one occupant characteristic;

control means operatively coupled to said sensing means for determining an occupant position within the vehicle passenger compartment in response to said at least one sensed occupant characteristic and for providing a control signal in response to said determined occupant position; and occupant positioning means for positioning the occupant to said determined occupant position in response to said control signal;

said occupant positioning means including means for manually moving an occupant seat, said control means including means for indicating a location of said determined occupant position.

8. The apparatus of claim 7 wherein said sensing means provides an electrical signal indicative of the girth of the vehicle occupant.

9. The apparatus of claim 7 wherein said sensing means provides an electrical signal indicative of the leg length of the vehicle occupant.

10. The apparatus of claim 7 wherein said sensing means provides an electrical signal indicative of each of occupant weight, height, girth, and leg length.

11. The apparatus of claim 7 wherein said control means includes means for determining the occupant position relative to an actuatable restraining device.

12. The apparatus of claim 7 wherein said control means includes means for determining the occupant position relative to the occupant's view through vehicle windows, distance to steering wheel, and distance to vehicle operating pedals.

13. An apparatus for controlling position of an occupant in a vehicle passenger compartment comprising:

sensing means for sensing at least one occupant characteristic and providing a signal indicative of said at least one occupant characteristic;

control means operatively coupled to said sensing means for determining an occupant position within the vehicle passenger compartment in response to said at least one sensed occupant characteristic and for providing a control signal in response to said determined occupant position; and occupant positioning means for positioning the occupant to said determined occupant position in response to said control signal;

said control means including an override selection means operatively connected to the occupant positioning means for permitting the occupant to override said occupant position determined by said control means so that said occupant positioning means responds to said override selection means.

14. The apparatus of claim 13 wherein said control means includes means for storing an occupant desired position location, said occupant positioning means moving said occupant to said occupant desired position location in response to actuation of said override selection means.

15. The apparatus of claim 14 wherein said control means includes means for controlling a vehicle occupant restraint system in response to said occupant desired position location.

16. An apparatus for controlling position of an occupant in a vehicle passenger compartment comprising:

sensing means for sensing at least one occupant characteristic and providing a signal indicative of said at least one occupant characteristic;

control means operatively coupled to said sensing means for determining an occupant position within the vehicle passenger compartment in response to said at least one sensed occupant characteristic and for providing a control signal in response to said determined occupant position; and occupant positioning means for positioning the occupant to said determined occupant position in response to said control signal;

said sensing means providing an electrical signal indicative of the height of the vehicle occupant.

17. An apparatus for controlling position of an occupant in a vehicle passenger compartment comprising:

sensing means for sensing at least one occupant characteristic and providing a signal indicative of said at least one occupant characteristic;

control means operatively coupled to said sensing means for determining an occupant position within the vehicle passenger compartment in response to said at least one sensed occupant characteristic and for providing a control signal in response to said determined occupant position; and occupant positioning means for positioning the occupant to said determined occupant position in response to said control signal;

said sensing means providing an electrical signal indicative of the girth of the vehicle occupant.

18. An apparatus for controlling position of an occupant in a vehicle passenger compartment comprising:

sensing means for sensing at least one occupant characteristic and providing a signal indicative of said at least one occupant characteristic;

control means operatively coupled to said sensing means for determining an occupant position within the vehicle passenger compartment in response to said at least one sensed occupant characteristic and for providing a control signal in response to said determined occupant position; and occupant positioning means for positioning the occupant to said determined occupant position in response to said control signal;

said sensing means providing an electrical signal indicative of the leg length of the vehicle occupant.

19. An apparatus for controlling position of an occupant in a vehicle passenger compartment comprising:

sensing means for sensing at least one occupant characteristic and providing a signal indicative of said at least one occupant characteristic;

control means operatively coupled to said sensing means for determining an occupant position within the vehicle passenger compartment in response to said at least one sensed occupant characteristic and for providing a control signal in response to said determined occupant position; and occupant positioning means for positioning the occupant to said determined occupant position in response to said control signal;

said sensing means providing an electrical signal indicative of each of occupant weight, height, girth, and leg length.

20. An apparatus for controlling position of an occupant in a vehicle passenger compartment comprising:

sensing means for sensing at least one occupant characteristic and providing a signal indicative of said at least one occupant characteristic;

control means operatively coupled to said sensing means for determining an occupant position within the vehicle passenger compartment in response to said at least one sensed occupant characteristic and for providing a control signal in response to said determined occupant position; and occupant positioning means for positioning the occupant to said determined occupant position in response to said control signal;

said control means including means for determining the occupant position relative to an actuatable restraining device.

21. An apparatus for controlling position of an occupant in a vehicle passenger compartment comprising:

sensing means for sensing at least one occupant characteristic and providing a signal indicative of said at least one occupant characteristic;

control means operatively coupled to said sensing means for determining an occupant position within the vehicle passenger compartment in response to said at least one sensed occupant characteristic and for providing a control signal in response to said determined occupant position; and occupant positioning means for positioning the occupant to said determined occupant position in response to said control signal;

said control means including means for determining the occupant position relative to the occupant's view through vehicle windows, distance to steering wheel, and distance to vehicle operating pedals.

22. A method for controlling position of an occupant in a vehicle passenger compartment, said method comprising the steps of:

sensing at least one physical characteristic of a vehicle occupant in a vehicle compartment;

determining an occupant position from said at least one sensed physical characteristic; and moving the occupant to the determined occupant position;

said step of sensing including sensing height of the occupant.

23. A method for controlling position of an occupant in a vehicle passenger compartment, said method comprising the steps of:

sensing at least one physical characteristic of a vehicle occupant in a vehicle compartment;

determining an occupant position from said at least one sensed physical characteristic; and moving the occupant to the determined occupant position;

said step of sensing including sensing girth of the occupant.

24. A method for controlling position of an occupant in a vehicle passenger compartment, said method comprising the steps of:

sensing at least one physical characteristic of a vehicle occupant in a vehicle compartment;

determining an occupant position from said at least one sensed physical characteristic; and moving the occupant to the determined occupant position;

said step of sensing including sensing leg length of the occupant.

25. A method for controlling position of an occupant in a vehicle passenger compartment, said method comprising the steps of:

sensing at least one physical characteristic of a vehicle occupant in a vehicle compartment;

determining an occupant position from said at least one sensed physical characteristic;

moving the occupant to the determined occupant position; and controlling actuation of a vehicle occupant restraint system in response to said occupant position.

26. A method for controlling position of an occupant in a vehicle passenger compartment, said method comprising the steps of:

sensing at least one physical characteristic of a vehicle occupant in a vehicle compartment;

determining an occupant position from said at least one sensed physical characteristic; and moving the occupant to the determined occupant position;

said step of determining including determining the occupant position relative to an actuatable restraining device.

27. A method for controlling position of an occupant in a vehicle passenger compartment, said method comprising the steps of:

sensing at least one physical characteristic of a vehicle occupant in a vehicle compartment;

determining an occupant position from said at least one sensed physical characteristic; and moving the occupant to the determined occupant position;

said step of determining including determining the occupant position relative to the occupant's view through the vehicle windows, distance between the occupant and the steering wheel, and distance to the vehicle operating pedals.

* * * * *